M. G. HUBBARD.
Gearing for Harvesters.
No. 82,411. Patented Sept. 22, 1868.
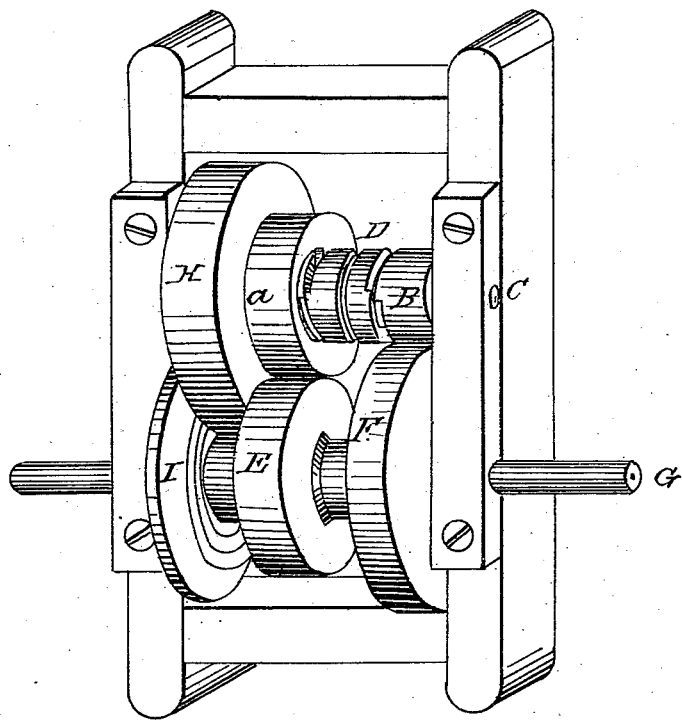
WITNESSES
INVENTOR

UNITED STATES PATENT OFFICE.

MOSES G. HUBBARD, OF SYRACUSE, NEW YORK.

IMPROVEMENT IN GEARING FOR HARVESTERS.

Specification forming part of Letters Patent No. 82,411, dated September 22, 1868.

*To all whom it may concern:*

Be it known that I, MOSES G. HUBBARD, of the city of Syracuse, in the State of New York, have invented certain new and useful Improvements in Harvesters; and that the following is a true and full description thereof, reference being had to the accompanying drawings, in which—

Figure 1 is a perspective view of my improvement.

My invention consists of an improved arrangement and connection of the gearing, adapting it within a compact space to give a high velocity to the bevel-wheel, and at the same time to the changing of the speed of the cutters of harvesters, in order to use a slow speed whenever the nature of the crop renders it practicable, and a high speed only when absolutely necessary, and thus increase the efficiency and durability of the machine. This object has been sought in various ways; but I believe no device has heretofore been invented which did not, by the increased weight, or expense, or complications, introduce objections greater than the benefits attained, while my plan is lighter and cheaper and more simple than the ordinary plan for gearing these machines, and accomplishes all the objects which experience has thus far shown to be desirable in gearing these machines.

In constructing my said improvement I support loosely the two gear-wheels A and B on the auxiliary shaft C, as shown, and place between them the double ratchet-clutch D, so feathered to its shaft that it can be moved endwise and into gear with either of the loose gear-wheels A or B. This double ratchet-clutch I operate by means of the gear-shifter for which a patent was issued to me, and dated June 4, 1867, but which forms no part of my present invention.

The said loose gear-wheels A and B are driven by the corresponding gear-wheels E and F, both of which are fixed firmly to the main shaft G, which, in my ordinary harvester, I support on two road-wheels, which are ratcheted to the ends of the said shaft G by means of the ratchet for which a patent was issued to me on the 29th day of November, 1864, but which forms no part of my present invention.

By this arrangement I attain a very simple, cheap, and light method of driving the auxiliary shaft C at different speeds, as may be required, and the gear-wheel H, or its equivalent, attached to shaft C, gears into and drives a pinion attached to the bevel-wheel I, which is loose on the shaft G, and which drives my crank-shaft by a bevel-pinion in the ordinary way.

In Fig. 1 my improved arrangement of gear is shown inclosed within a subdivision of the main frame, and the peculiar arrangement permits the use of small gear-wheels, as the arrangement comprises a new modification of what is commonly called a "triple gear," consisting of wheel F and its pinion B, wheel H and its pinion attached to bevel-wheel I, and the said bevel-wheel I and its corresponding bevel-pinion, being thus what is ordinarily called "speeded up" three times within an uncommonly small space, and requiring none of the gear-wheels to be over nine inches, or thereabout, in diameter.

The bevel-wheel I revolves in the same direction as the shaft G, and consequently produces but slight friction, and by running loose on the shaft it has less ring and noise than if keyed permanently to the shaft.

Having thus described my improvements, what I claim is—

1. The combination of the driving gear-wheels E and F, of unequal size, attached permanently to the main cross-shaft, and gearing into the two corresponding loose gear-wheels A and B, with sliding clutch $d$, and the firmly-attached gear-wheel H on the cross auxiliary shaft C, and the straight pinion and bevel-wheel I, revolving loosely on shaft G, arranged and operating specifically as described.

2. The triple gear, as described, in combination with the means for changing the speed of the cutters, arranged and located, relatively to the main and counter shafts, substantially as and for the purpose specified.

M. G. HUBBARD.

Witnesses:
GEO. E. DANA,
E. L. HASBERTS.